United States Patent
Huang et al.

(10) Patent No.: US 6,864,018 B2
(45) Date of Patent: Mar. 8, 2005

(54) BATTERY WITH A CONTROLLED RELEASE ANODE

(75) Inventors: John Huang, Auburn, AL (US); Jean Liu, Auburn, AL (US); Leon Wu, Auburn, AL (US)

(73) Assignee: Nanotek Instruments, Inc, Fargo, ND (US)

( * ) Notice: Subject to any disclaimer, the term of this patent is extended or adjusted under 35 U.S.C. 154(b) by 416 days.

(21) Appl. No.: 10/080,305

(22) Filed: Feb. 22, 2002

(65) Prior Publication Data

US 2003/0162095 A1 Aug. 28, 2003

(51) Int. Cl.[7] .......................... H01M 4/00; H01M 2/16; H01M 6/30
(52) U.S. Cl. .......................... 429/246; 429/27; 429/110
(58) Field of Search ................................ 429/246, 247, 429/110, 27

(56) References Cited

U.S. PATENT DOCUMENTS

| | | |
|---|---|---|
| 3,341,416 A | 9/1967 | Anderson et al. |
| 3,952,741 A | 4/1976 | Baker |
| 4,005,246 A * | 1/1977 | Schiffer et al. ............... 429/94 |
| 4,020,247 A | 4/1977 | Birt et al. |
| 4,139,679 A | 2/1979 | Appleby et al. |
| 4,185,143 A | 1/1980 | Birt et al. |
| 4,910,104 A | 3/1990 | Rao et al. |
| 5,116,695 A | 5/1992 | Rao et al. |
| 5,139,900 A | 8/1992 | Tada et al. |
| 5,196,275 A | 3/1993 | Goldman et al. |
| 5,225,291 A | 7/1993 | Rao et al. |
| 5,250,370 A | 10/1993 | Faris et al. |
| 5,318,861 A | 6/1994 | Harats et al. |
| 5,360,680 A | 11/1994 | Goldman et al. |
| 5,418,080 A | 5/1995 | Korall et al. |
| 5,569,551 A | 10/1996 | Pedicini et al. |
| 5,639,568 A | 6/1997 | Pedicini et al. |
| 5,691,074 A | 11/1997 | Pedicini |
| 5,773,176 A | 6/1998 | Serenyi |
| 5,837,402 A | 11/1998 | Araki et al. |
| 6,040,087 A * | 3/2000 | Kawakami ............... 429/218.1 |

* cited by examiner

*Primary Examiner*—Patrick Ryan
*Assistant Examiner*—Julian Mercado (57) ABSTRACT

An electrochemical cell including a cathode, an electrolyte in ionic contact with the cathode, and an anode in physical contact with the electrolyte, wherein the anode contains a controlled release anode composition that includes at least a first anode active material and at least a first controlled release agent in physical contact thereto for tentatively isolating the first anode active material from the electrolyte in the beginning of a cell operation for a delayed reaction of the first anode active material. Preferably, the anode further contains an initial-stage anode active material in direct contact with the electrolyte. Such a controlled release anode can be used in a variety of electrochemical cells including metal-air batteries, such as a zinc-air battery, for an extended period of operating time.

15 Claims, 3 Drawing Sheets

BATTERY WITH A CONTROLLED RELEASE ANODE

BACKGROUND OF THE INVENTION

1. Field of the Invention

The present invention relates to an electrochemical cell with a long operating life. In particular, this invention relates to batteries with a controlled release anode to achieve an extended operating life.

2. Brief Description of the Prior Art

Metal-air batteries produce electricity by the electrochemical coupling of a reactive metallic anode to an air cathode through a suitable electrolyte in a cell. The air cathode is typically a sheet-like member, having one surface exposed to the atmosphere and another surface exposed to the aqueous electrolyte of the cell. During cell operation oxygen is reduced within the cathode while anode metal is oxidized, providing a usable electric current flow through an external circuit connected between the anode and cathode. The air cathode must be permeable to air but substantially impermeable to aqueous electrolyte, and must incorporate an electrically conductive element to which the external circuit can be connected. Commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, lithium, alloys of aluminum and alloys of magnesium are considered especially advantageous for particular applications, owing to their low cost, light weight, and ability to function as anodes in metal-air battery using a variety of electrolytes.

A typical aluminum-air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. Aqueous electrolytes for metal-air batteries consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In neutral-pH electrolyte, the cell discharge reaction may be written as:

$$4Al+3O_2+6H_2O \rightarrow 4Al(OH)_3 \text{(solid)}$$

In alkaline electrolyte, the cell discharge reaction may be written:

$$4Al+3O_2+6H_2O+4KOH \rightarrow 4Al(OH)_4^- +4K^+ \text{(liquid solution)},$$

followed, after the dissolved potassium (or sodium) aluminate exceeds saturation level, by:

$$4Al(OH)_4^- +4K^+ \rightarrow 4Al(OH)_3 \text{(solid)}+4KOH$$

In addition to the above oxygen-reducing reactions, there is also an undesirable, non-beneficial reaction of aluminum in both types of electrolyte to form hydrogen, as follows:

$$2Al+6H_2O \rightarrow 2Al(OH)_3+3H_2 \text{(gas)}.$$

There is a need for a metal-air battery which can be used as a main power source at locations where electric supply lines do not exist. Such a battery must have a high energy capacity and a high power density and be capable of running for a long period of time under high load. There is also a need for a metal-air battery that can provide much extended "talk time" and "stand-by" time for a mobile phone. A need also exists for a light-weight battery that can power a notebook computer for a much longer period of time (e.g., 12 hours needed to last for a trans-Pacific flight).

State-of-the-art metal-air batteries have exhibited the following drawbacks:

(1) Severe "anode passivation" problem: When the battery is run under high load, large amounts of aluminum hydroxide accumulate on the aluminum anode surface blocking the further access of anode by the electrolyte. Such an anode passivation phenomenon tends to prevent the remaining anode active material (coated or surrounded by a ceramic layer) from contacting the electrolyte. Consequently, the electron-generating function ceases and the remaining active anode material can no longer be used (hence, a low-utilization anode). All metal anodes used in state-of-the-art metal-air batteries suffer from the anode passivation problem to varying degrees.

(2) Severe self-discharge and current leakage problems: "Self-discharge" is due to a chemical reaction within a battery that does not provide a usable electric current. Self-discharge diminishes the capacity of a battery for providing a usable electric current. For the case of a metal-air battery, self-discharge occurs, for example, when a metal-air cell dries out and the metal anode is oxidized by the oxygen that seeps into the battery during periods of non-use. Leakage current can be characterized as the electric current that is supplied to a closed circuit by a metal-air cell even when air is not provided to the cell. These problems also result in a low-utilization anode.

(3) Severe corrosion problem: Four metals have been studied extensively for use in metal-air battery systems: zinc (Zn), aluminum (Al), magnesium (Mg), and lithium (Li). Despite the fact that metals such as Al, Mg, and Li have a much higher energy density than zinc, the three metals (Al, Mg, and Li) suffer from severe corrosion problems during storage. Hence, Mg-air and Al-air cells are generally operated either as "reserve" batteries in which the electrolyte solution is added to the cell only when it is decided to begin the discharge, or as "mechanically rechargeable" batteries which have replacement anode units available. Since the serious corrosion problem of Zn can be more readily inhibited, Zn-air batteries have been the only commercially viable metal-air systems. It is a great pity that high energy density metals like Al, Mg and Li have not been used in a primary or secondary cell.

Due to their high energy-to-weight ratio, safety of use, and other advantages, metal-air, and particularly zinc-air, batteries have been proposed as a preferred energy source for use in electrically-powered vehicles. However, just like in aluminum-air cells, zinc-air batteries also suffer from the problem of "passivation", in this case, by the formation of a zinc oxide layer that prevents the remaining anode active material (Zn) from contacting the electrolyte. A number of techniques have been proposed to prevent degradation of battery performance caused by zinc oxide passivation. In one technique, a sufficient (usually excessive) amount of electrolyte was added to allow most of the zinc to dissolve (to become Zn ion, thereby giving up the desired electrons). The large amount of electrolyte added significantly increased the total weight of the battery system and, thereby, compromise the energy density.

In a second approach, anodes are made by compacting powdered zinc onto brass current collectors to form a porous mass with a high surface/volume ratio. In this configuration, the oxide does not significantly block further oxidation of the zinc, provided that the zinc particles are sufficiently small. With excessively small zinc particles, however, zinc is rapidly consumed due to self-discharge and leakage (regardless when the battery is in use or not) and even more serious corrosion problems and the battery will not last long.

An interesting approach to extending the operating time of a battery, particularly a metal-air battery as a main power source for vehicle propulsion, is the use of "mechanically rechargeable" primary battery systems. Such a system normally comprises a consumable metal anode and a non-consumable air cathode, with the metal anode being configured to be replaceable once the metal component therein is expended following oxidation in the current-producing reaction. These systems constituted an advance over the previously-proposed secondary battery systems, which have to be electrically charged for an extended period of time once exhausted, and require an external source of direct current.

Most of these mechanically rechargeable systems are quite complex in construction. For instance, the system disclosed in U.S. Pat. No. 4,139,679 (Feb. 13, 1979 to A. Appelby, et al.) contains an active particulate metal anode component freely suspended in an alkaline electrolyte, and a pump to keep the particulate metal anode in suspension and circulated between air cathodes. After discharge of the metal anode component, the electrolyte is then replaced with an electrolyte containing a fresh particulate metal anode component in suspension.

Mechanically rechargeable metal-air batteries with mechanically replaceable anodes have been further developed, e.g., in U.S. Pat. No. 5,196,275 (Mar. 23, 1993 to Goldman, et al.); U.S. Pat. No. 5,360,680 (Nov. 1, 1994 to Goldman, et al.); U.S. Pat. No. 5,318,861 (Jun. 7, 1994 to Harats, et al.); and U.S. Pat. No. 5,418,080 (May 23, 1995 to Korall, et al.), the teachings of which are incorporated herein by reference. These systems have been designed particularly for use in electric vehicle propulsion, since they facilitate quick recharging of the vehicle batteries simply by replacing the spent anodes, while keeping the air cathodes and other battery structures in place. This mechanical recharging, or refueling, may be accomplished in service stations dedicated to that purpose. However, it is necessary to provide metal-air battery cells that will repeatedly allow insertion and removal of the zinc anode elements for each charge/discharge cycle without causing wear and tear to the mechanically-sensitive air electrode flanking each zinc anode.

Another approach to extending the discharge life of a metal-air battery is the "variable-area dynamic anode" method proposed by Faris (e.g., U.S. Pat. No. 5,250,370, Oct. 5, 1993). Such a battery structure includes electrodes which are moved relative to each other during operation. The electrodes also have areas that are both different in size, with ratios that are variable. The battery structure includes a first electrode which is fixed in a container. A second electrode is moved past the fixed electrode in the container and battery action such as discharge occurs between proximate areas of the first and second electrodes. A third electrode may be provided in the container to recharge the second electrode as areas of the second electrode are moved past the third electrode at the same time that other areas of the second electrode are being discharged at the first electrode. The ratio of the third electrode area to the first electrode area is much larger than 1, resulting in a recharge time that is much faster, thereby improving the recharge speed. However, this battery structure is very complicated and its operation presents a reliability problem.

For a prolonged storage of metal-air cells, Pedicini (U.S. Pat. No. 5,691,074, Nov. 25, 1997) proposed a diffusion-controlled air vent containing isolating passageways that function to limit the amount of oxygen that can reach the oxygen electrodes when the fan is off and the internal humidity level is relatively constant. This isolation reduces the self-discharge and leakage or drain current of the metal-air cells. In U.S. Pat. No. 5,569,551 (Oct. 29, 1996) and U.S. Pat. No. 5,639,568 (Jun. 17, 1997), Pedicini, et al. proposed the use of an anode bag to limit self-discharge of the cell in an attempt to maintain the capacity of the cell. It was stated that, by wrapping the anode in a micro-porous membrane that is gas-impermeable and liquid-permeable, oxygen from the ambient air that has seeped into the cell must go through a solubility step before it can pass through the anode bag to contact and discharge the anode. However, this solubility step is often not a slow step particularly when the oxygen or air ingress rate into the cell is high. This anode bag provides only a moderately effective approach to reducing the self-discharge problem. This is achieved at the expense of making the cell structure very complicated.

Delayed-action or deferred actuated batteries have been proposed for the purpose of prolonging the dry storage period of a battery. For instance, Birt, et al. (U.S. Pat. No. 4,020,247, Apr. 26, 1977 and U.S. Pat. No. 4,185,143, Jan. 22, 1980) disclosed water-activated primary batteries, which could be stored in a dried electrolyte condition and become activated whenever water is added. Similarly, seawater-activated batteries are disclosed by Rao, et al. (U.S. Pat. No. 4,910,104, Mar. 20, 1990; U.S. Pat. No. 5,116,695, May 26, 1992; and U.S. Pat. No. 5,225,291, Jul. 6, 1993). Once water or seawater is added to these cells, all relevant reactions (including those associated with the self-discharge, current drain, passivation, and/or corrosion) will proceed and continue until completion. These batteries, once activated, still suffer from the premature power loss problems due to self-discharge, current leakage, and/or passivation.

Previous attempts to alleviate the anode corrosion problems in a metal-air cell included the addition of corrosion-inhibiting ingredients (e.g., In, Bi, Ca, CaO, PbO, and $Bi_2O_3$); e.g., as disclosed in U.S. Pat. No. 5,139,900 (Aug. 18, 1992 to K. Tada, et al.) and U.S. Pat. No. 5,773,176 (Jun. 30, 1998 to J. Serenyi). In U.S. Pat. No. 5,837,402 (Nov. 17, 1998), K. Araki, et al. disclosed an anode that is composed of zinc powder particles having their surfaces coated with copper/indium or silver. However, the coating remains porous so that electrolyte can still contact the underlying zinc particle in order for the zinc particle to still function as an active material. These porous coatings serve to reduce the corrosion problem, but do not isolate the anode active material (zinc) from the electrolyte. Furthermore, they do not provide effective protection against self-discharge or current leakage.

Therefore, it is an object of the present invention to provide an anode material that significantly reduces or eliminates the anode passivation, self-discharge, current leakage, and/or anode corrosion problems.

It is another object of the present invention to provide an anode that has a controlled release function.

Still another object of the present invention is to provide an electrochemical cell that contains a controlled release anode for an extended cell operating life.

A specific object of the present invention is to provide a metal-air battery that has a long operating life.

Another specific object of the present invention is to provide an anode that can make use of high energy density metals such as Li, Mg, and Al by avoiding or alleviating the otherwise severe corrosion problems commonly associate with these metals.

SUMMARY OF THE INVENTION

The present invention provides an electrochemical cell comprising a cathode, an electrolyte in ionic contact with the cathode, and an anode in physical contact with the electrolyte. The anode in such a cell is characterized by comprising a controlled release anode composition that includes at least a first anode active material and a first controlled release agent. The first controlled release agent is in physical contact with the first anode active material (e.g., with the first controlled release agent fully encapsulating the first anode active material) for tentatively isolating the first anode active material from the electrolyte in the beginning of a cell operation for a delayed oxidation of the first anode active material.

In a preferred embodiment, the anode in the above-cited electrochemical cell further contains an initial-stage anode active material in direct contact with the electrolyte. This initial-stage anode active material provides the electric current during the initial operating stage of the electrochemical cell. This initial stage begins when the cell is activated. This initial stage ends when the initial-stage active material is completely consumed or no longer capable of providing a desired power level to an external device (e.g., a mobile phone) possibly due to passivation. At or slightly before this point of time, the first anode active material (which was initially protected from being in direct contact with the electrolyte) is now exposed to the electrolyte and begins to provide electric power. Optionally, more than one additional anode active material protected by one or more than one controlled release agent may be used to continue to provide electric power after the initial-stage and first anode active materials are no longer active. In other words, various types of anode active materials take their turn to provide electric power to an external device. While waiting for their turns to come, they are protected by controlled release materials to avoid any potential premature energy loss caused by self-discharge, current leakage, or corrosion. In this manner, the external device can be operated for extended periods of time.

If the cell cathode comprises an oxygen electrode and the first or second anode active material includes a metal element, then the cell constitutes a metal-air battery.

Any metal with a negative electromotive force (emf), relative to a hydrogen half-cell as a standard, may be used as an active anode material. However, it is preferred that the first and/or the second anode active material is a metal or metallic alloy that contains a metal element selected from the group consisting of lithium, magnesium, aluminum, iron, titanium, manganese, nickel, and zinc. The first anode active material may be the same as or different from the second anode active material. It is of great interest to note that the second, third, or fourth anode active material can now be selected from Al, Mg, and Li that were previously considered to be too highly corrosive to be used as an anode active material in a metal-air cell. This is because now, in accordance with the present invention, these elements can be coated, embedded, or encapsulate with a controlled release agent, which also serves to protect (isolate) the underlying metal from the corroding electrolyte or oxygen until when it is the time for the metal to be exposed to the electrolyte to serve as an anode active material.

The controlled release agent may be a polymer, ceramic, glass, carbon, organic, metallic material, or a composite or hybrid material. The first anode active material is preferably in a form of fine particles that are coated with, embedded in, or encapsulated by the controlled release agent. The first anode active material may also be in a fibrous, plate-like, disc-like, rod-like, or needle-like form which is either coated with the controlled release agent or somehow separated from the electrolyte by the controlled release agent, for instance, through encapsulating or embedding.

DESCRIPTION OF THE PREFERRED EMBODIMENTS

Figure 1:
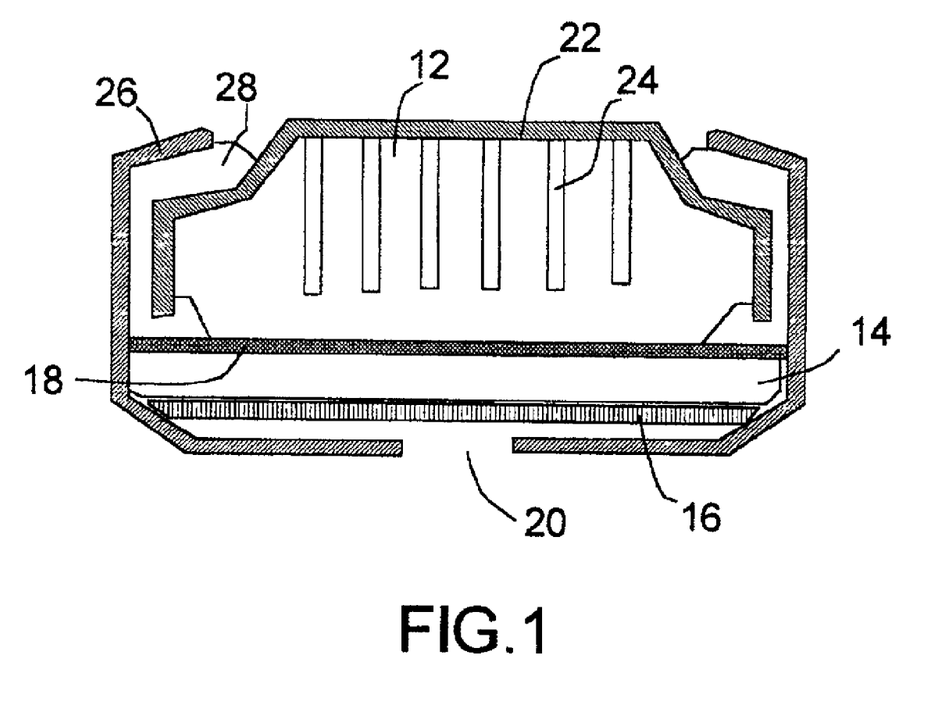
FIG. 1 Cross-section of a button-shaped metal-air cell, wherein the anode active material (e.g., Zn or Al particles) is surrounded by an electrolyte (e.g., KOH solution).
Figure 2:
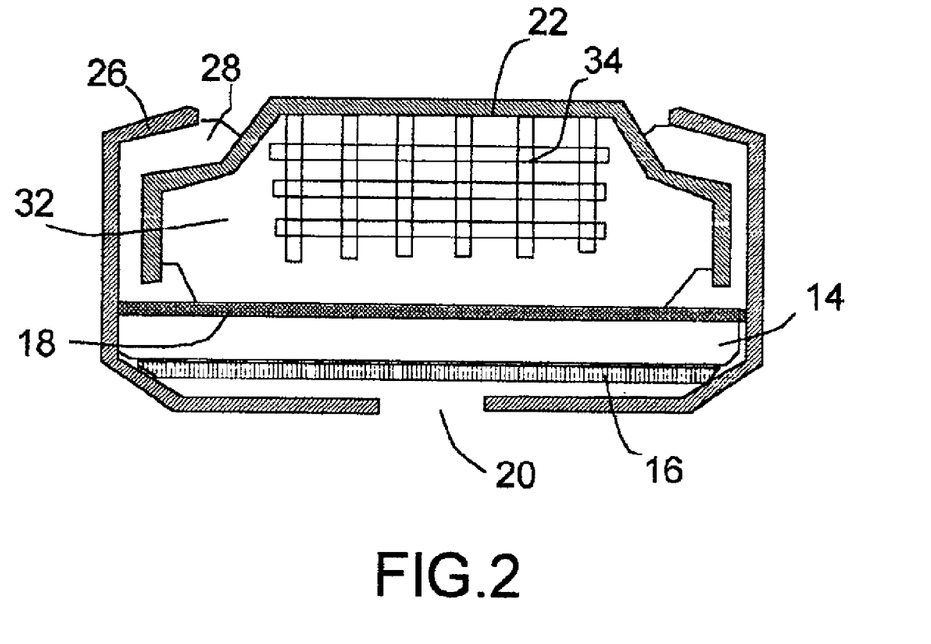
FIG. 2 Cross-section of another button-shaped metal-air cell.
Figure 3:
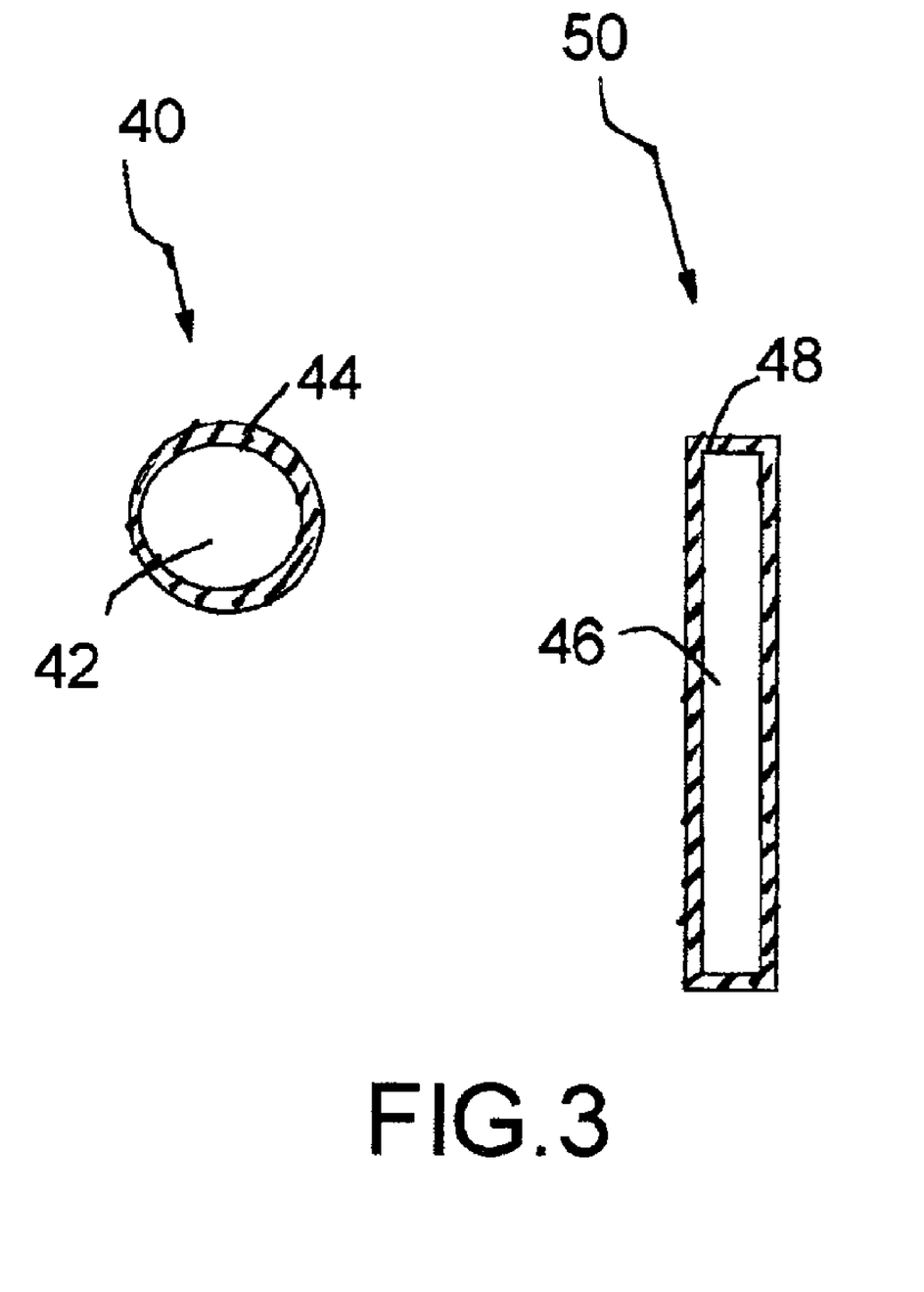
FIG. 3 Cross-sections of a controlled release agent-encapsulated particle (A) and that of a controlled release agent-coated plate (B).

An electrochemical cell typically includes a cathode, an electrolyte in ionic contact with the cathode, and an anode in physical contact with the electrolyte. FIG. 1 shows one example of an electrochemical cell, a button-type metal-air battery. This battery contains an air access port 20 and an air-diffusion membrane 16 through which oxygen may enter the cell through a porous cathode 14 (which preferably contains some electro-catalyst) and a separator 18. In FIG. 1, an anode 12 is shown to be in the form of fine metal particles dispersed in an electrolyte solution. Anode current collectors 22, 24 are in electronic contact with the anode 12. An insulating gasket 28 is positioned between the anode 12 and a steel casing 26. FIG. 2 shows another variant of a button-type metal-air cell in which a web-shaped anode 34 (containing an anode active material) is immersed in an electrolyte solution 32 which may or may not contain any anode active material as a dispersed phase. In accordance with a preferred embodiment of the present invention, the anode in an electrochemical cell such as a metal-air cell is characterized by comprising a controlled release anode composition (e.g., 40 or 50 in FIG. 3) that includes at least a first anode active material (e.g., 42 or 46) and a first controlled release agent (e.g., 44 or 48). The first controlled release agent (e.g., 48) protects the underlying first anode active material (e.g., 46) in such a fashion that the first anode active material is isolated tentatively from the electrolyte composition in the beginning of a cell operation. This isolation can be obtained by allowing the first controlled release agent (e.g., 48) to fully coat or encapsulate the first anode active material (e.g., 46). This isolation is maintained for a predetermined period of time during which the first anode active material (e.g., zinc in a zinc-air battery) does not react with either electrolyte or oxygen to avoid any potential self-discharge or current leakage. Such a controlled release anode is useful if a period of cell storage and transportation is anticipated prior to the inception of the intended cell discharge process.

However, in a further preferred embodiment, the anode in the above-cited electrochemical cell (featuring a first anode active material protected by a first controlled release agent) further contains an initial-stage anode active material in direct contact with the electrolyte composition. This initial-stage anode active material provides the electric current during the initial operating stage of the electrochemical cell. This initial stage begins when the cell is activated; e.g., when electrolyte solution is filled into the proper cell compartment and oxygen is allowed to enter through the cathode of a zinc-air battery. During this initial stage, the first controlled release material serves to eliminate any self-discharge, current leakage, and corrosion problem of the first anode active material when the initial-stage material works to provide electricity. This initial stage ends when the initial-stage active material is completely consumed or no longer capable of providing a desired power level to an external device (e.g., a mobile phone) possibly due to passivation (e.g., the formation of a zinc oxide layer, if any, on a zinc particle). At or slightly before this point of time, the first anode active material, which was initially protected against the attack of both the electrolyte and oxygen by the first controlled release material, is now exposed to the electrolyte and begins to provide electric power to an external device. Optionally, a second anode active material protected by a second controlled release agent may be used to continue to provide electric power after the initial-stage and first anode active materials are no longer capable of providing adequate electric power. Further optionally, a third (and fourth, etc.) anode active material protected by its own controlled release agent may be activated at a much later stage to supply the needed power. In this manner, the external device can be operated for extended periods of time.

For the purpose of illustrating the concepts behind the invented electrochemical cell, metal-air cells are used as an example. The present invention is applicable to all electrochemical cells. In the practice of the present invention, any metal with a negative electromotive force (emf), with reference to $OH^-$ or $O^{-2}$ as a standard, may be used as an anode active material. For metal-air applications, however, it is preferred that the first, second, and/or third anode active material is a metal or metallic alloy that contains a metal element selected from the group consisting of lithium, magnesium, aluminum, iron, titanium, manganese, nickel, chromium, and zinc. The first anode active material may be the same as or different from the second or subsequent anode active materials. The second, third, and fourth anode active material can now be selected from Al, Mg, and Li that were previously considered to be too highly corrosive to be used as an anode active material in a metal-air cell. This is because now, in accordance with the present invention, these elements can be coated, embedded, or encapsulate with a controlled release agent which also serves to protect (isolate) the underlying metal from the corroding electrolyte or oxygen. This protection will end when the controlled release agent is penetrated, cracked open, dissolved by the electrolyte, or otherwise actuated by other mechanisms so that the underlying active metal is exposed to the electrolyte to initiate an anode reaction.

Controlled release compositions are used to provide continuing activity of an active agent to an intended target over an extended period of time without the need for additional applications of the active agent. Useful active agents include, for example, medicines, pesticides, herbicides, cosmetics, laundry products, pigments, and many other materials. For these agents a delayed release and/or continuous release is in some cases desirable in order to maximize the effectiveness of the active agent and minimize or eliminate undesirable effects. Four mechanisms are commonly employed to achieve controlled release: (1) desorption from strong sorbents, like silica gel, mica, and activated charcoal; (2) diffusion; (3) erosion or destruction of barrier materials; and (4) release after retrograde chemical reactions, such as hydrolysis, thermodynamic dissociation, or thermal degradation. The present invention primarily makes use of the second, third and fourth mechanisms.

The delivery rate of an active agent from a controlled release system is primarily influenced by the architecture of the system, the properties of the impregnant (containing an active agent) and the rate-controlling matrix, and the driving force releasing the impregnant from the matrix. Physical controlled release compositions are either reservoir systems or monolithic systems. In a reservoir system, the active agent is encapsulated within a rate-controlling membrane. The membrane permeability and the membrane configuration determine the release rate. In a monolithic system, the active agent is dissolved or dispersed throughout a matrix, such as a polymer. Both types can be used in the practice of the present invention. The presently invented controlled release anode achieves one or both of the following two technical goals: (a) a tentative isolation of an anode active material from an electrolyte so that no significant anode reaction will occur until after a predetermined period of time (an "exposure on demand" process or sudden exposure of the anode active material to electrolyte); and (b) a sustained (intermittent, continuous, or otherwise programmed) exposure of an anode active material to electrolyte.

One of the most effective and currently wide-spread means of achieving the goal of controlled agent release is encapsulation, which is also a preferred technique in the practice of the present invention. Encapsulation involves the formation of a protective wall of some type around a small particle, agglomeration of particles, or droplet of agent material. The wall is composed of a material suitable to achieve this goal. The wall material and thickness may be selected according to the degree of permeability needed, the time required for the electrolyte exposure to begin, and the type of undesirable reactions to be avoided. The active agent and wall materials can together comprise solid and liquid mono-nuclear structures, emulsion and suspension compositions, and solid/liquid combinations in which a liquid is adsorbed into a porous matrix, as well as poly-nuclear structures involving solids, liquids, or both, and having more than one wall or agent layer.

To prepare capsules of these types a wide variety of methods and processes can be used. One method involves the use of fluidized beds. In this process, particles of active agent material are sprayed with wall material while they are suspended in a gas stream, e.g., air or nitrogen. The controlled release agent or wall material sprayed can be of a polymer solution, a molten wax, molten sulfur, an emulsion, a suspension such as a latex, or other material, and is continued until the desired wall thickness is obtained. Regardless of the method or materials chosen, the goal is to produce a composition capable of controlled agent release (i.e., controlled exposure of an active anode material to electrolyte), such as release or exposure at a predetermined time. This release or exposure can be immediate upon introduction into a selected environment, it can be delayed for a specific amount of time, or in the case of a number of agent particles or drops having differing wall thicknesses or compositions, it may be continuous over periods of varying lengths. The release is effected by varying mechanisms acting on the wall, such as by dissolution by the electrolyte, reaction with the electrolyte, or osmotic diffusion causing rupture of the capsule wall. U.S. Pat. No. 3,952,741 (Apr.

27, 1976 to R. Baker), for example, illustrates a controlled delivery system based on osmotic bursting of a water-permeable wall. The wall thickness and strength may be designed to meet the required moment of time at which exposure of an anode active material to the electrolyte begins.

Alternatively, the micro-capsules of this invention are prepared by coating the zinc powder with a hydrophobic polymeric material employing the technique known as organic phase separation essentially as described in J. Anderson et al. (U.S. Pat. No. 3,341,416, Sept. 12, 1967) for the micro-encapsulation of aspirin particles. In this technique, cores containing the active agent are suspended in a solution of a film-forming hydrophobic polymer in an appropriate solvent at elevated temperature. Upon cooling the polymer separates from solution and deposits as a film on the cores.

Among the polymers which can be employed as capsule wall materials, are included natural, halogenated and synthetic rubbers, cellulose derivatives such as ethylcellulose, cellulose nitrate, benzylcellulose, cellulose acetate and cellulose butyrate; styrene-type polymers such as polystyrene and polystyrene-maleic acid; polyalkylenes such as polyethylene, polypropylene and polybutylene; polyvinyl derivatives such as polyvinyl acetate, polyvinyl chloride and polyvinyl alcohol; and polyacrylic derivatives such as polyacrylic acid, polyacrylonitrile, polymethacrylate and polybutylacrylate. Examples of solvents which can be used include ethyl methyl ketone, isobutyl methyl ketone, acetone tetrahydrofuran, 1,4-dioxane, ethyl acetate, butyl acetate, cyclohexanone, cyclohexane, ethylene dichloride, toluene, chloroform, carbon tetrachloride and the like.

A particular combination of core material (containing an anode active material), hydrophobic polymeric microcapsule wall material, and solvent must be chosen so that (a) the hydrophobic polymeric material is insoluble in the solvent at room temperature but has increasing solubility as the temperature is raised so that the polymer which is in solution at elevated temperature separates from the solution and deposits on the core material as the temperature is lowered, and (b) the core material remains unchanged and insoluble in the solvent throughout the temperature range employed.

The controlled release agent (e.g., a capsule wall material) may be a polymer, ceramic, glass, carbon, organic, metallic material, or a composite or hybrid material. The first anode active material is preferably in a form of fine particles that are coated with, embedded in, or encapsulated by the controlled release agent. The first anode active material may also be in a fibrous, plate-like, disc-like, rod-like, or needle-like form which is either coated with the controlled release agent or somehow separated from the electrolyte by the controlled release agent, for instance, through encapsulating or embedding.

In addition to fluidized bed coating and organic phase separation, a wide variety of well known techniques can be used to coat, embed, or encapsulate an anode active material with a controlled release agent. These include electroplating, electrodeless coating, electrochemical deposition, physical vapor deposition, chemical vapor deposition, plasma deposition, surface polymerization, solution coating, solvent casting, thermal spraying, solution spraying, and their combinations.

Again, for the purpose of illustrating the utility value of the presently invented electrochemical cell, the cell design parameters will be provided for a zinc-air battery system, but it must be understood that the present invention is not limited to this particular type of cell. The theoretical energy density ratio of zinc can be calculated by using physical property values readily available in physics textbooks. Zinc has a density of 7.13 g/cm$^3$ and an atomic concentration of $6.55 \times 10^{22}$ atoms/cm$^3$. Each zinc atom will give two electrons, hence there will be $(2 \times 6.55 \times 10^{22})$ electrons per cm$^3$ or 7.13 grams of zinc. Since there are $1.6 \times 10^{-19}$ coulombs per electron, we have $(2 \times 6.55 \times 10^{22}) \times (1.6 \times 10^{-19})/7.13 = 2,940$ Coulomb/gram.

But, this charge amount is available at 1.2 volts, hence the energy density in watt-hours per kilogram is: $2,940 \times 1.2 \times 1000/3,600 = 980$ watt-hours/kilogram. The results of similar calculations for other selected metals intended for use in a metal-air battery are summarized in Table 1, where the working voltages used in the calculations were approximate values.

TABLE 1

Summary of energy density calculation results for selected metal elements.

| Metal | Atomic mass, g/mole | Density g/cm$^3$ | Valency | Estimated working voltage, V | Atoms/cm$^3$ ($\times 10^{22}$) | Atoms/g ($\times 10^{22}$) | Coulomb/g | Watt-hours/Kg |
|---|---|---|---|---|---|---|---|---|
| Li | 6.94 | 0.534 | 1 | 3.4 | 4.63 | 8.67 | 13,879 | 13,108 |
| Mg | 24.312 | 1.738 | 2 | 2.7 | 4.30 | 2.48 | 7,923 | 5,943 |
| Al | 26.981 | 2.699 | 3 | 2 | 6.02 | 2.23 | 10,710 | 5,950 |
| Ti | 47.9 | 4.507 | 2 | 2 | 5.66 | 1.26 | 4,022 | 2,234 |
| Mn | 54.938 | 7.47 | 2 | 2 | 8.18 | 1.10 | 3,506 | 1,948 |
| Zn | 65.38 | 7.133 | 2 | 1.2 | 6.57 | 0.92 | 2,947 | 982 |
| Cr | 51.996 | 7.19 | 3 | 1.15 | 8.32 | 1.16 | 5,557 | 1,775 |
| Fe | 55.847 | 7.87 | 2 | 0.8 | 8.48 | 1.08 | 3,449 | 766 |
| Ni | 58.71 | 8.902 | 2 | 0.65 | 9.13 | 1.02 | 3,281 | 592 |

Despite a reasonably high energy density for zinc, current commercial zinc-air batteries have achieved only 150 watt hours/kilogram. There are two principal factors that contributed to the reduction in energy density are involved. The first is the overhead weight which includes the weights of the external case, electrolyte, and wires. The second is that only the zinc anode surface is involved in the chemical reaction. Specifically, just like all other metal-air batteries, current zinc-air batteries suffer from the problem of "passivation" by the formation of a zinc oxide layer that prevents the remaining anode active material (Zn) from contacting the electrolyte. In other words, not all Zn atoms are fully utilized in providing electrons to the external device. Earlier attempts to prevent degradation of battery performance caused by zinc oxide passivation involved adding a sufficient (usually excessive) amount of electrolyte to allow most of the zinc to dissolve. However, the large amount of electrolyte added to the cell significantly increased the total weight of the battery system, thereby compromising the energy density.

As indicated earlier, several recent efforts have focused on the development of fine powder based Zn anodes, which can be made by compacting powdered zinc onto brass current collectors to form a porous mass with a high surface/volume ratio. In this configuration, the oxide does not significantly block further oxidation of the zinc provided the zinc particles are sufficiently small. With excessively small zinc particles, however, all zinc particles could be rapidly consumed and the battery will not last long. An optimum zinc particle size for a particular Zn-electrolyte combination must be carefully determined in order for the zinc-air battery to function as a long lasting power source. Alternatively, very thin sheets of zinc may be used as an anode active material.

Comparative Design Case 1:

To further illustrate the battery design concepts inherent in the present invention, let us use a current zinc-air battery (Model EF-M2-33 for use in Motorola StarTAC mobile phone) as an example. The battery is rated at a power capacity of 3300 mAh×3.6 v=11.88 watt-hours. The battery is designed to provide a "talk time" of 6–16 hours or "stand-by" time of 80–350 hours (3.33–14.6 days). With an energy density of 980 watt-hours/Kg for Zn, this capacity requires at least 12.1 grams of Zn (i.e., 11.88/980=0.0121 Kg). In actuality, much more Zn was used in this commercially available battery. The total weight of this battery (Zn plus overhead weights) is rated at 79 grams.

In order to extend the "stand-by" time to 30 days, an approximate Zn anode amount of 25 grams will be required, provided that all 25 grams of Zn is fully utilized. Unfortunately, by simply doubling the amount of unprotected Zn in anode does not double the "stand-by" time, largely due to the problems of passivation, current leakage, and self-discharge (e.g., through direct ZnO formation in the electrolyte without providing electrons to the external device, the mobile phone). There appears to be an approximately 60% utilization efficiency only for the second 12.5 grams.

Comparative Design Case 2:

In accordance with the present invention, a new Zn-air battery can be designed in such a way that the first 12 grams of Zn, in a fine powder form (average particle size of 8–20 $\mu$m), is packed together and attached to a copper-based current collector. This first 12 grams of Zn is in direct contact with the KOH electrolyte (just like in a conventional Zn-air cell) and provides the first 14 days of stand-by time to a mobile phone. This first 12 grams of Zn in the present invention is referred to as the "initial-stage" anode active material. The next 13 grams of Zn, also in the form of fine particles, are fully encapsulated with a controlled release polymer, which is designed to be dissolvable in KOH and to begin to expose the underlying Zn particles to KOH in slightly less than 14 days. This 13 grams of Zn provides approximately 16 days of stand-by time, making the total stand-by time now up to 30 days. This is possible due to the fact that, with the protection from the controlled release material, there is no possibility of self-discharge or current leakage associated with this extra 13 grams of Zn. This is achieved by adding 13 grams of Zn, plus perhaps additional 13 grams of overhead materials (controlled release material, extra electrolyte, slightly more casing material, etc.), to the total weight of the battery. With a total battery weight of (79+26=105 grams) providing a power of 24.5 watt-hours, the over-all battery energy density is now (24.5/0.105=233 watt-hours/Kg), which reflects a major improvement from (11.88/79=150 watt-hours/Kg). By incorporating a second and third amounts of anode active Zn designed to be released at much later times, a battery providing a mobile phone stand-by time of two or three months with an over-all energy density of better than 400 watt-hours is now possible.

Comparative Design Case 3:

Assume that 12 grams of Zn is used as the initial-stage anode active material, as in the above Comparative Case 2. The next 13 grams of first anode active material is now magnesium powder particles with an average particle size of 20 $\mu$m that are protected by a controlled release polymer in such a fashion that 6 grams of Mg are exposed to KOH after 14 days and the remaining 7 grams are exposed to KOH after additional N days. This N may be calculated as follows: Mg has an energy density of up to 5942 watt-hours/Kg (Table 1). The 6 grams of Mg will buy us an extra period of N=(5942/980×(14×6/12)=42.4 days. The remaining 7 grams, after a total (14+42.4) days, begin to provide electric power. The operating life of this battery is further extended by (42.4× 7/6=49.5 days). Hence, the total anode now provides a total stand-by time of (14+42.4+49.5=105.9 days) with a total capacity of (11.88+5942×0.013=89.13 watt-hours). This is achieved by adding only 13 grams of Mg to the otherwise Zn-air battery, plus approximately 13 grams of overhead weight. The over-all battery energy density is now (89.13/0.105=848.8 watt-hours/Kg). This ultra-high energy density can be further increased if additional amount of controlled release Mg is added. An impressive 1000 watt-hours/Kg of battery density is readily achievable if the anode active material under the protection of controlled release materials is lithium (energy density=13,107 watt-hours/Kg of Li) instead of magnesium. This would not have been possible if unprotected Zn had been used as the only anode active material mainly due to passivation, self-discharge, and current leakage. Further, this would not have been possible if unprotected Li had been used as the only anode active material mainly due to self discharge and corrosion problems. The fact that the controlled release material functions to expose an anode active material at the correct timing and to protect an anode active material against corrosion and self-discharge makes this class of exceptionally long operating life batteries technically feasible and economically viable.

The presently invented cells or batteries may further include a feature to allow for prolonged dry storage. For instance, one may choose to manufacture and deliver a battery to a customer in such a fashion that the electrolyte phase in the battery does not contain any significant amount of water. The customer may simply add water to activate the battery and the initial-stage anode active material will begin to function as soon as an aqueous electrolyte solution is formed. This preferred embodiment of the present invention not only has the desirable feature of deferred actuation, but also has the feature of reduced or eliminated passivation, self-discharge, and corrosion. The configurations of these deferred actuated batteries may be similar to those disclosed in Birt, et al. (U.S. Pat. No. 4,020,247) and Rao, et al. (U.S. Pat. No. 5,116,695) cited in an earlier section.

Another preferred embodiment of the present invention is a multiple-cell battery assembly in which the cells are connected in series and/or in parallel and at least one cell contains at least a controlled release anode. Further preferably, all cells contain at least a controlled release anode.

The following examples are given for the purpose of illustrating how a controlled release anode can be made.

They should not be construed as limiting the scope of the present invention.

EXAMPLE 1

Micro-encapsulation of Zn powder by phase separation is carried out as follows: about 0.2 to 1 percent by weight, preferably about 0.4 to 0.8 percent by weight of ethylcellulose and about 0.2–2 percent by weight, preferably about 1.2–1.7 percent by weight of polyethylene is dissolved in about 75–85 percent by weight of cyclohexane. Zn powder (average particle size of 20 $\mu$m), about 5 times of the total weight of ethylcellulose and polyethylene combined, is introduced and suspended by rapid agitation. The temperature is raised to the reflux temperature of the solvent and maintained for about 5 minutes. The mixture is then cooled with continued agitation to about 40° C.; the solvent is decanted and the remaining micro-capsules are washed with fresh cyclohexane and dried. Polyethylene is used in the above-described procedure as a phase-separation inducing agent. Its presence depresses the solubility of ethylcellulose and causes it to separate from solution at slightly temperature where it has better flow properties and lower viscosity. The amount of polyethylene, as a part of the controlled release agent, may be adjusted to provide different durations of time when an electrolyte such as KOH begins to reach Zn particles. An experiment was conducted by immersing a small amount of coated-Zn particles in a KOH solution and intermittently removing a small specimen of particles out to a microscope stage for examination. It was found that these durations of time for Zn to be exposed to KOH range from approximately 2 hours to 6 days. The resulting micro-capsules are generally spherical with a mean diameter of about 25 to 45 $\mu$m. The polymer coating constitutes about 5 to 15 percent by weight of the micro-capsule and ranges in thickness from about 3 to 11 microns. The controlled release days could be further extended when a thin layer of epoxy-silicone coating was applied to these micro-capsules.

EXAMPLE 2

Twelve (12) grams of a zinc powder having an average particle size of 8 $\mu$m were added to a mixture of 750 cc of water and 350 cc of 0.03 N nitric acid. This slurry was stirred for 5 minutes for the purpose of slightly etching the zinc particles to remove any undesirable chemical species thereon. Thereafter, 500 cc of an aqueous solution of copper nitrate (0.5 g) was added to the above-prepared slurry of the etched zinc powder and the resulting solution was stirred for 7 minutes. Then, water was removed with other chemical species rinsed away. Upon drying, the copper-coated Zn powder and additional 12 grams of un-coated Zn powder were mixed with a 60% aqueous dispersion of polytetrafluoroethylene (PTFE). The mixture was pasted to several thin sheets of copper to fabricate an anode. A nickel hydroxide plate was used as a cathode. The two electrodes, with a cellophane sheet interposed as a separator, were encased in a polyethylene bag to fabricate a battery. The electrolyte was KOH at a concentration of 400 g/L. For comparison purpose, a similar battery with an anode that contained 24 grams of un-protected Zn The batteries thus fabricated were measured for the discharge capacity. The results indicate that the cell with an anode containing only un-protected Zn provides a power capacity of approximately 15.5 watt-hours, while the cell with a controlled release anode (12 grams un-protected plus 12 grams copper-coated) provide a capacity of 20.05 watt-hours.

EXAMPLE 3

An aluminum powder (15 g) having an average particle size of 15 $\mu$m was stirred with 1000 cc of water vigorously by a wet method, with 0.03 N acetic acid (500 cc) being added to etch the Al particles. Thereafter, 2 grams of a heat-curable paste of silicone rubber and acetic acid was added to this Al powder slurry and the resulting mixture was vigorously agitated for 10 minutes. After vaporizing the acetic acid, the mixture was pressed against a 2.5 mm-thick copper plate in a hot press and was cured at 100° C. for 45 minutes. Several small specimens of silicone rubber-encapsulated Al particles were immersed in an aqueous solution of 45% KOH. It was found that the silicone rubber coating, with a layer thickness from approximately 2–10 $\mu$m, served to protect the AL particles against KOH for approximately 25 to 90 days. Several metal-air cells were prepared for energy capacity measurements: (A) anode based on 15 grams of un-protected AL powder, (B) anode based on 30 grams of un-protected AL powder, and (C) anode based on 15 grams of un-protected AL powder and 15 grams of thin silicone rubber-coated AL powder. The useful energy capacity values, under a low load condition, were found to be 58 watt-hours (specimen A), 77 watt-hours (specimen B), and 114 watt-hours (specimen C), respectively. These correspond to energy densities of 3,866 watt-hours/Kg (short term), 2,567 watt-hours/Kg, and 3,800 watt-hours/Kg (based on Al weight), respectively. A comparison between specimens B and C clearly demonstrates that an anode containing only un-protected Al powder suffers from a significant power loss likely due to self-discharge, current leakage, and corrosion. The controlled release material (silicone rubber) has effectively avoided these problems.

What is claimed is:

1. A metal-air electrochemical cell comprising an oxygen cathode, an electrolyte an ionic contact with said oxygen cathode, and an anode in physical contact with said electrolyte, wherein said anode comprises a controlled release anode composition that comprises at least a first anode active metal material and at least a first controlled release agent in physical contact thereto for tentatively isolating said first anode active material from said electrolyte in the beginning of a cell operation for a delayed oxidation of said first anode active material.

2. The electrochemical cell as set forth in claim 1, wherein said anode further comprises an initial-stage anode active material in direct contact with said electrolyte.

3. The electrochemical cell as set forth in claim 1 or 2, wherein said first anode active material comprises a metallic element selected from the group consisting of lithium, magnesium, aluminum, titanium, manganese, iron, chromium, nickel, and zinc.

4. The electrochemical cell as set forth in claim 1 or 2, wherein said controlled release agent contains a material selected from the group consisting of a polymer, a ceramic, a glass, a carbon, an organic, a metallic material, and combinations thereof.

5. The electrochemical cell us set forth in claim 1 or 2, wherein said first anode active material is in a form of fine particles that are coated, plated, embedded or encapsulated with said controlled release agent.

6. The electrochemical cell as set forth in claim 1 or 2, wherein said first anode active material is in a fibrous, plate-like, disc-like, rod-like, or needle-like form which is coated, plated, embedded or encapsulated with said controlled release agent in such a way that said first anode active material is separated from said electrolyte during an initial stage of a cell operation.

7. The electrochemical cell as set forth in claim 2, wherein said first anode active material differs in chemical composition from said initial-stage anode active maternal.

8. The electrochemical cell as set forth in claim 2, wherein said initial-stage anode active material comprises zinc and said first anode active material contains a metallic element selected from the group consisting of lithium, magnesium, aluminum, titanium, manganese, iron, chromium, nickel, and zinc.

9. The electrochemical cell as set forth in claim 1 or 2, wherein said first anode active material is coated or encapsulated with said first controlled release agent by a technique selected from the group consisting of electroplating, electrodeless costing, electrochemical deposition, physical vapor deposition, chemical vapor deposition, plasma deposition, organic phase separation, surface polymerization, solution coating, solvent casting, fluidized bed coating, thermal spraying, solution spraying, and combinations thereof.

10. The electrochemical cell as set forth in claim 1 or 2, wherein said first anode active material is coated or encapsulated with said first controlled release agent comprising a metal having an electromotive force smaller than the electromotive force of said first anode active material but greater than the electromotive force of an oxygen half cell.

11. The electrochemical cell as set forth in claim 1 or 2, wherein said first anode active material is fully coated or encapsulated with said first controlled release agent, said agent comprising a metal with a small electromotive force selected from the group consisting of nickel, tin, lead, antimony, bismuth, and indium.

12. The electrochemical cell as set forth in claim 1 or 2, wherein controlled release is achieved through the mechanism selected from the group consisting of desorption, diffusion, erosion, wear or destruction of a barrier material, degradation, chemical reaction, hydrolysis, thermodynamic dissociation, and combinations thereof.

13. A multiple-cell battery assembly comprising a plurality of electrochemical cells, wherein at least one of said cells is a cell as defined in claim 1 or 2.

14. The electrochemical cell as set forth in claim 1 or 2, wherein said electrolyte is substantially force from a liquid during a cell storage period and said cell is actuated when a liquid is added to said electrolyte.

15. The electrochemical cell as set forth in claim 14, wherein said liquid comprises water.

* * * * *